United States Patent [19]

Horsch

[11] 3,913,616

[45] Oct. 21, 1975

[54] CLUTCH SHAFT WITH FLUID DISTRIBUTION MEANS

[75] Inventor: Joachim Horsch, Lombard, Ill.

[73] Assignee: International Harvester Company, Chicago, Ill.

[22] Filed: May 20, 1974

[21] Appl. No.: 471,539

[52] U.S. Cl.............. 137/580; 192/87.1; 192/113 B
[51] Int. Cl.² ........................................ E03B 1/00
[58] Field of Search ........ 137/580; 192/87.1, 87.15, 192/87.16, 87.17; 74/467; 277/DIG. 8

[56] References Cited
UNITED STATES PATENTS

| | | | |
|---|---|---|---|
| 2,362,581 | 11/1944 | Newcomb | 137/580 X |
| 2,883,019 | 4/1959 | Kershner | 192/87.15 X |
| 3,037,602 | 6/1962 | Clements | 192/87.15 |

*Primary Examiner*—Benjamin W. Wyche
*Attorney, Agent, or Firm*—John W. Gaines; Floyd B. Harman

[57] ABSTRACT

Transmission having a number of lubricant cooled friction engaging means, a majority of which at any time are nonselected for operation, and further having flow blocking sleeves individual to the friction engaging means to restrict same for only lo cooling flow to the majority which, as indicated, are the nonselected ones, and moving automatically and conjointly with movement of each selected one of the friction engaging means to unblock hi cooling flow to that one while at and to and from engaged position.

2 Claims, 9 Drawing Figures

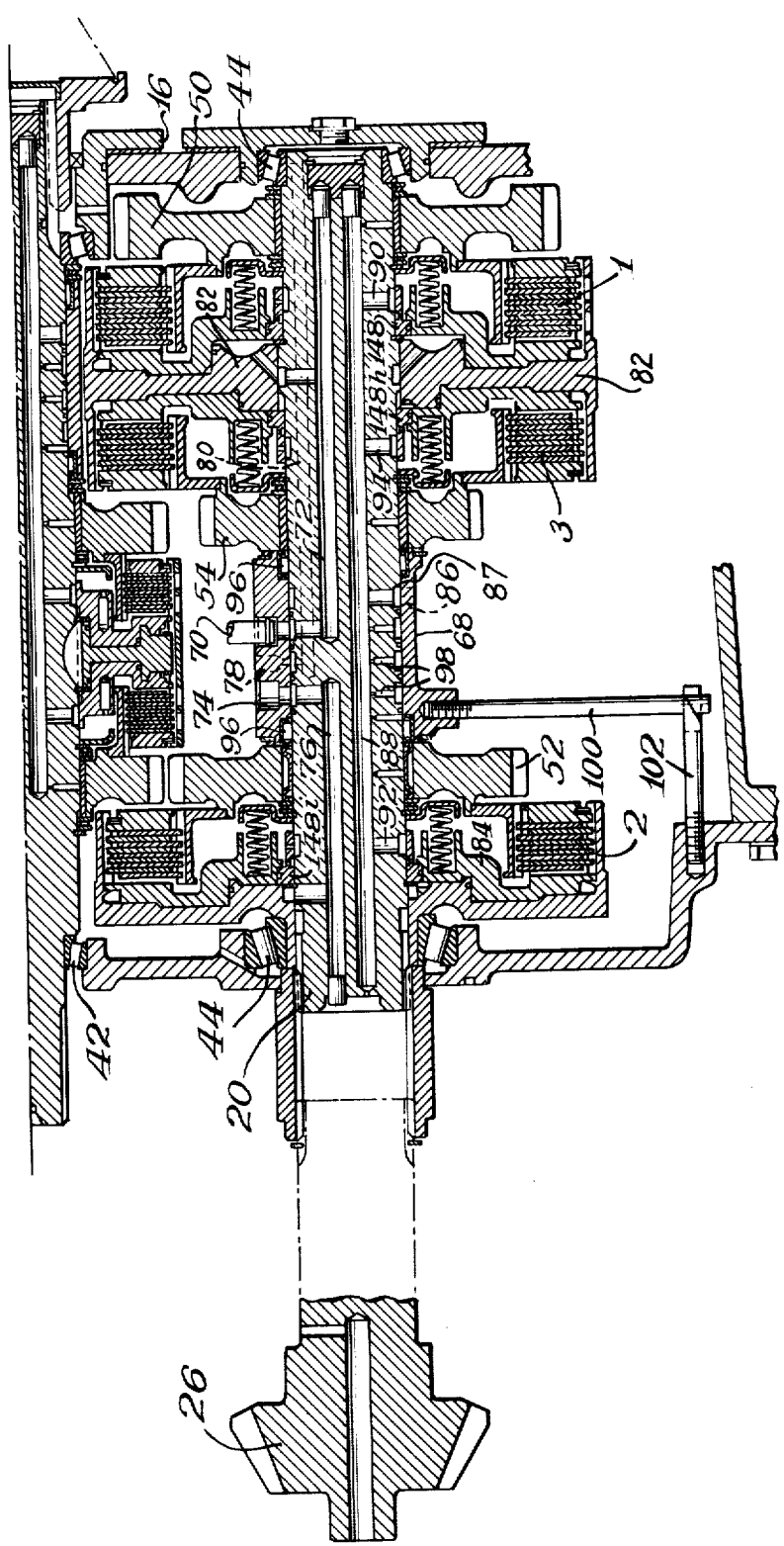

CLUTCH SHAFT WITH FLUID DISTRIBUTION MEANS

This application relates to lubricant cooled friction engaging means, particularly fluid clutches and brakes each controlled so as to have two rates of cooling flow.

It is a known practice that fluid flow and fluid pressure control is afforded to friction engaging means, e.g., a fluid clutch or fluid brake, by means of a single system. According to the practice, the fluid at the point it is being applied as hydraulic pressure to cause the friction engaging means to be operated or not is likewise used at or near the application point to provide hydraulic cooling flow to the same friction engaging means. The difference is the hydraulic operating pressure at that point is kept at line pressure whereas, where used for cooling at that point, it must be bled down to a pressure low but adequate for cooling flow. Heat from frictional engagement and disengagement can raise temperatures excessively high when there is no provision in the system for cooling.

The change in pressure in such a single system presents a problem. That is to say, cooling and clutch actuation occur only alternately. Otherwise, production of cooling flow while the friction means is engaged will cause available line pressure to bleed down, because the large or small proportion of flow allocated to cooling will inherently produce a large or small drop in line pressure. Continuously maintaining cooling flow at a steady rate is used as one attack on the problem mentioned, but doing so introduces drawbacks in the single system and other systems, particularly such a system involving a number of friction engaging means therein.

My invention in its provision of two rates of cooling flow to each of a number of friction engaging means, materially reduces or substantially eliminates the foregoing problem, as will now be explained in detail. Features, objects, and advantages will either be specifically pointed out or become apparent when, for a better understanding of the invention, reference is made to the following description taken in conjunction with the accompanying drawings, which show a preferred embodiment thereof and in which:

FIGS. 1, 2, and 3 are developed longitudinal elevational views of the respective upper rear, lower rear, and front portions of a vehicle transmission embodying the present invention;

FIGS. 1, 2, and 3 are combined to show all portions of the transmission;

Figure 1:
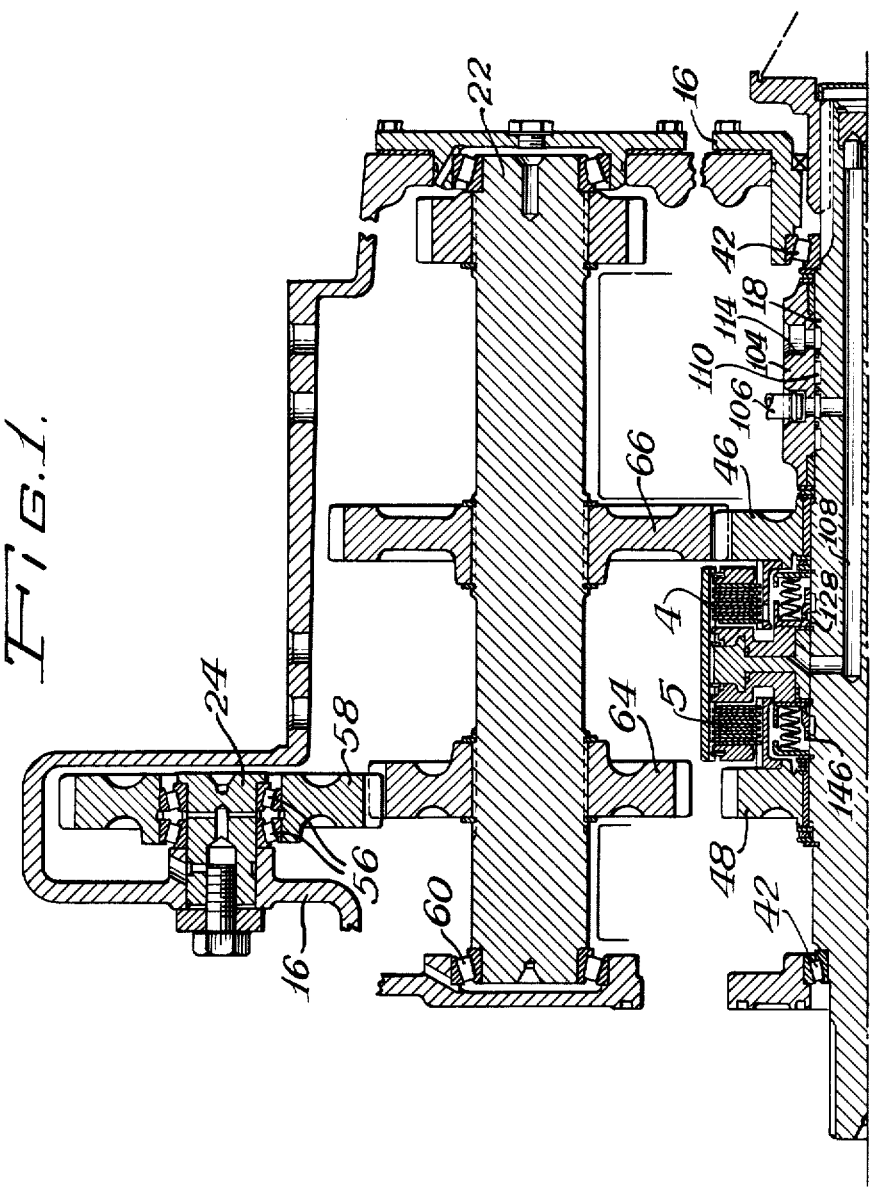
Figure 4:
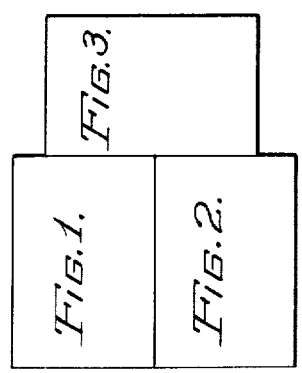
FIG. 4 is a diagram showing how
Figure 3:
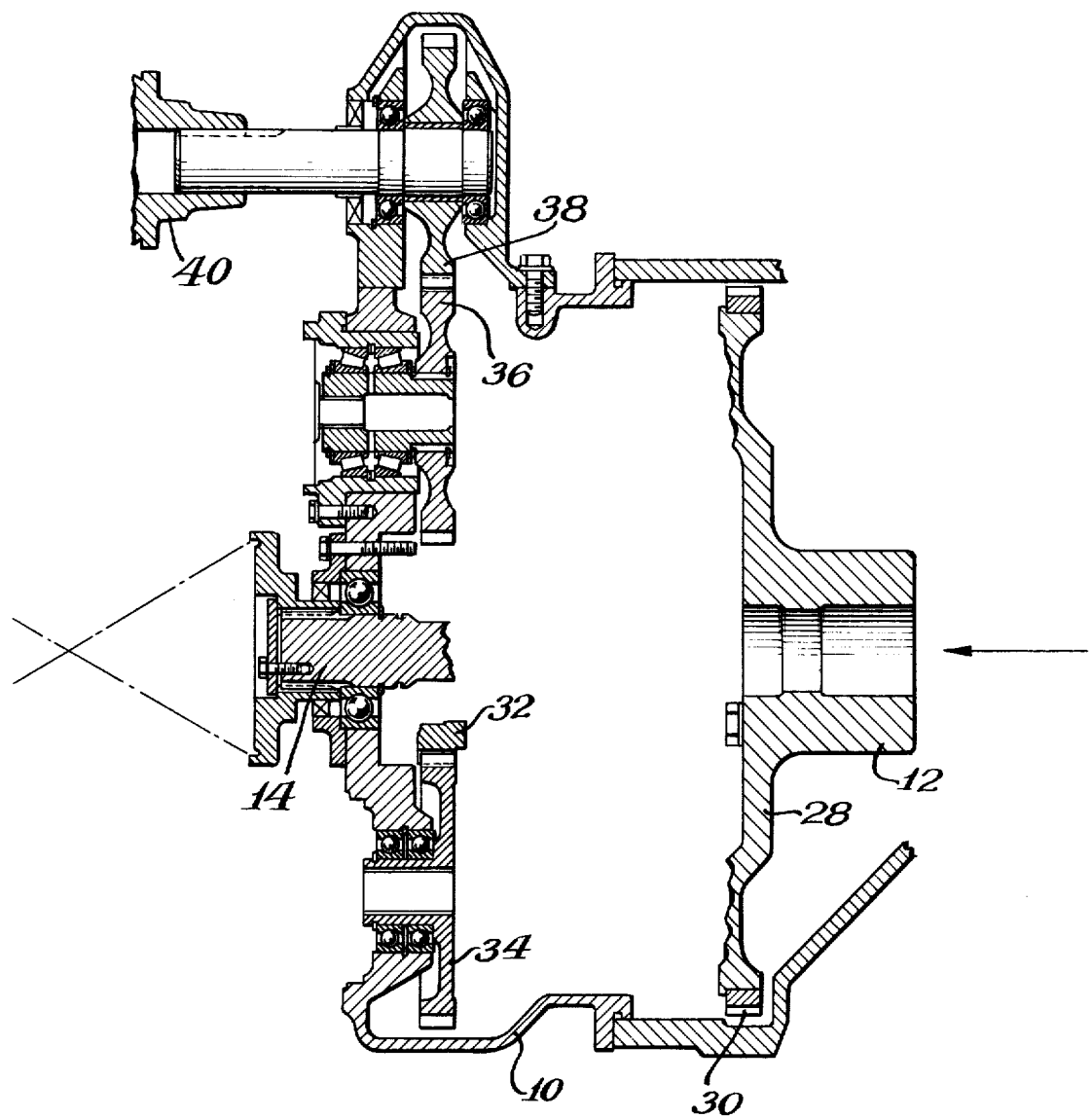
Figure 5:
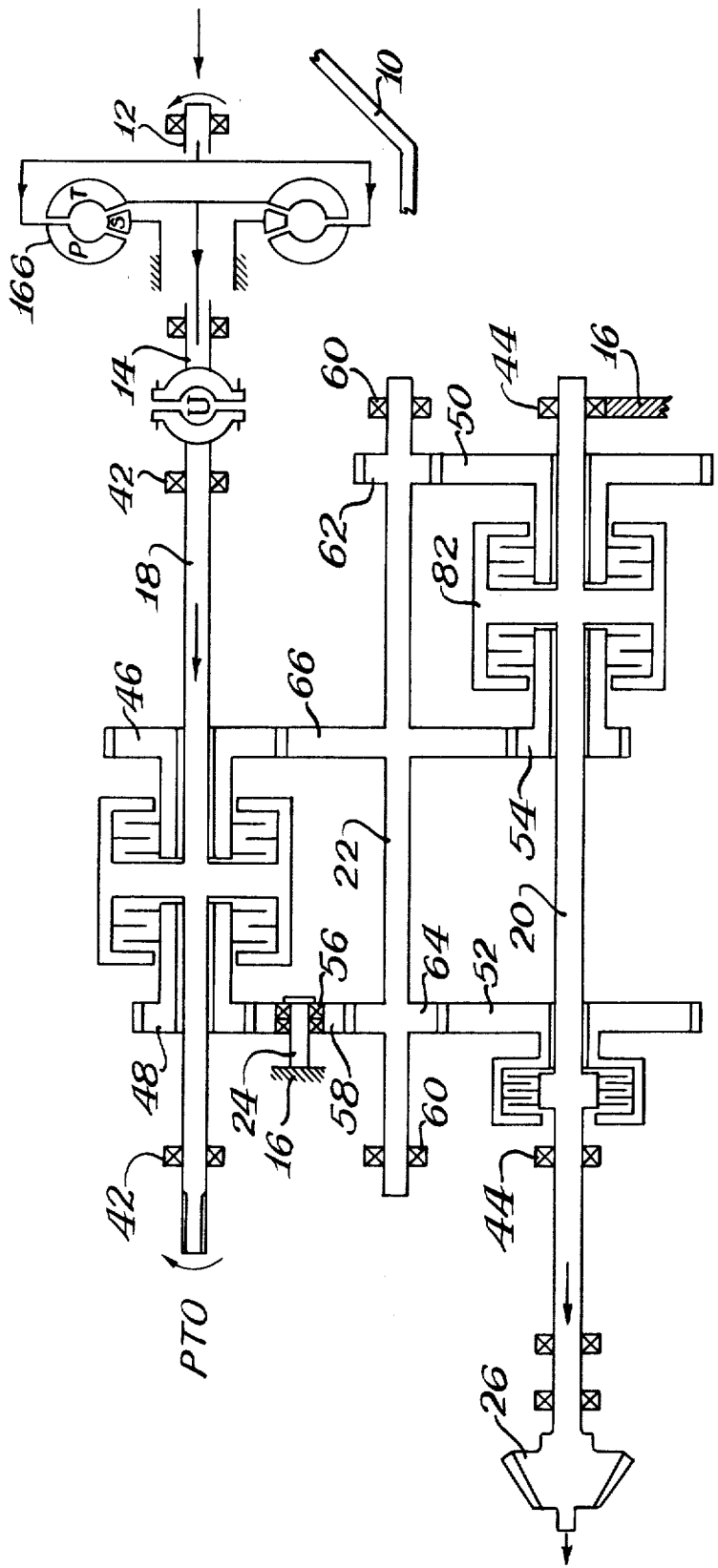
FIG. 5 is a simplified schematic view of the transmission, complete with a coupling device in the input and depicting the meshing operation more fundamentally.
Figure 6:
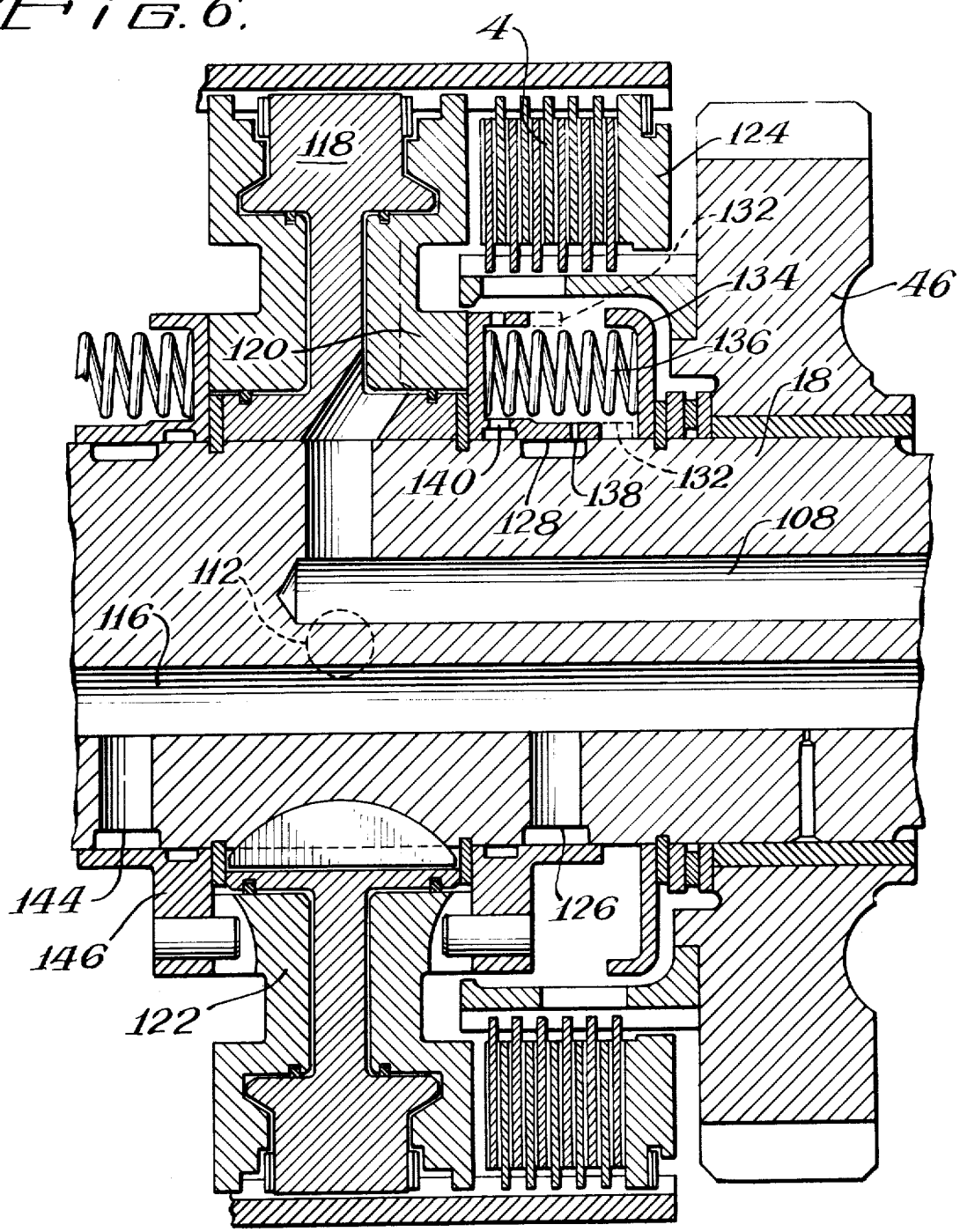
Figure 7:
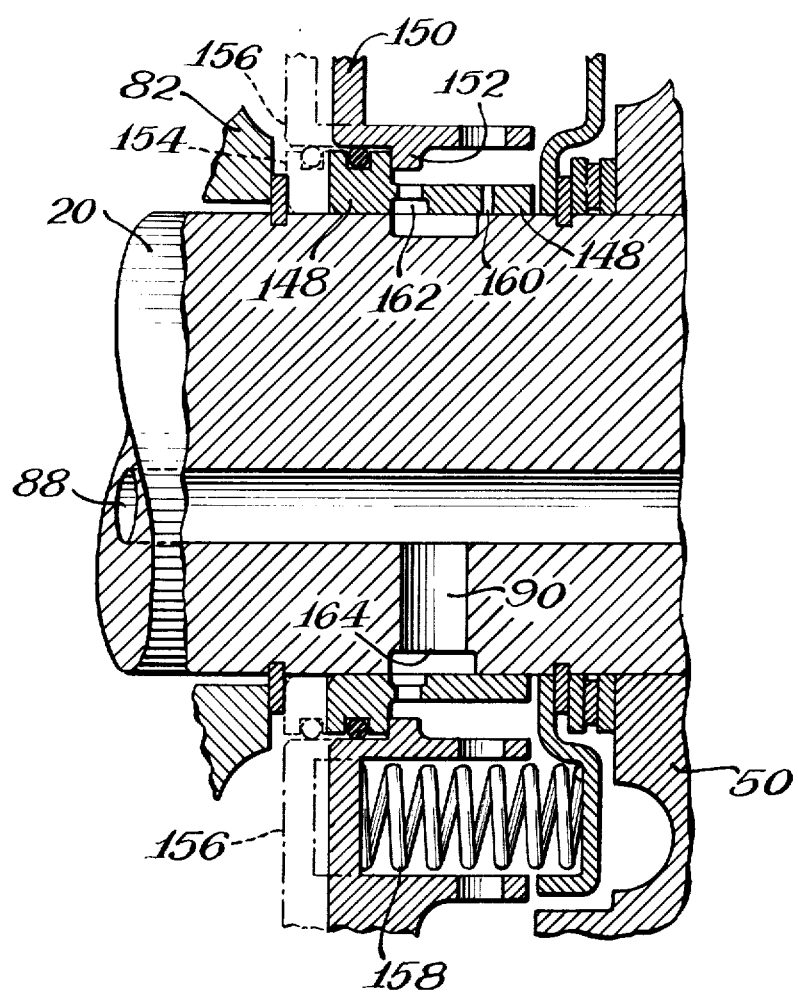
Figure 9:
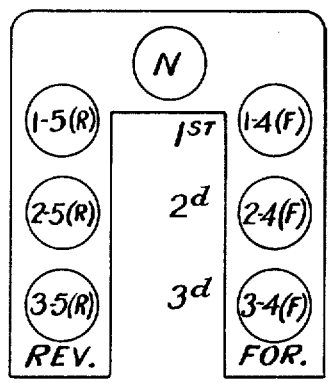
Figure 8:
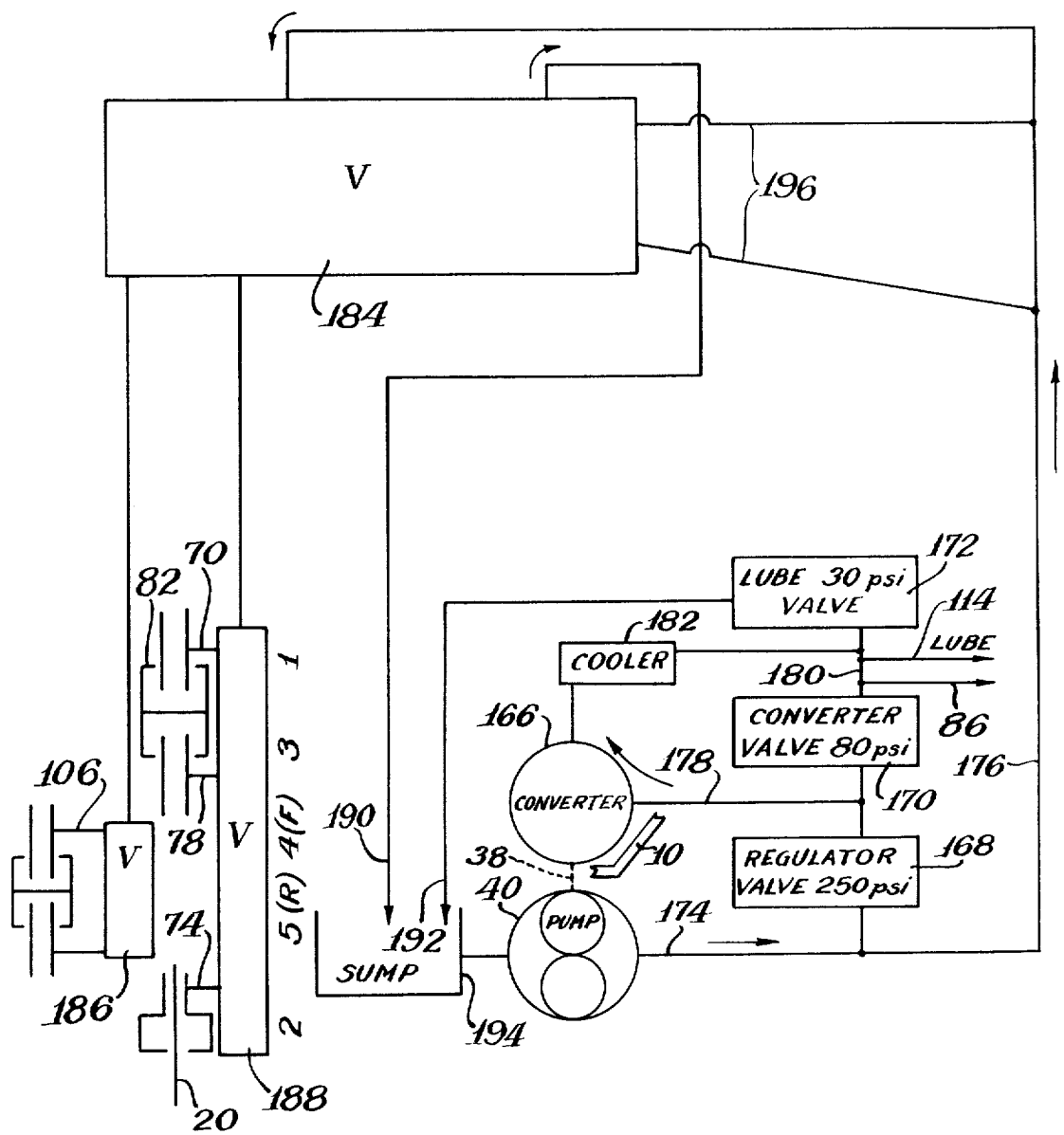

FIGS. 6 and 7 show details of FIG. 1 to an enlarged scale, namely, a direction clutch 4 and a speed clutch 1, respectively;

FIG. 8 schematically shows the transmission of FIG. 7 with certain parts omitted and with the hydraulic control system added; and FIG. 9 shows the shift pattern for the transmission system of FIG. 8 as neutralized, and as shifted to three forward and reverse speeds wherein the numbers within the circles designating shift positions refer to the transmission clutches engaged for the desired direction and ratio in the two speed ranges.

In FIGS. 1, 2, 3, and 5, a countershaft power shift transmission is shown effective for transmitting torque in various forward speed range and reverse speed range ratios dependent upon which friction engaging device in each of two sets is selectively engaged. The numerals 1, 2, 3, 4, and 5 refer to disk clutches in the respective devices whereby it is possible by the shift pattern of FIG. 9 to determine which clutches are so selected for engagement. Specifically, clutches 1, 2, and 3 form a set of speed ratio or range clutches for the vehicle carrying the transmission system, and clutches 4 and 5 are in another set known as direction clutches in which the forward (F) clutch 4 conditions the transmission for forward drive of the vehicle and the reverse (R) clutch 5 is for reverse. Each gear ratio and direction is established by a direction clutch and speed clutch being engaged and, unless one clutch from each set is engaged, power will not be transmitted through the transmission. These speed clutches are technically the load clutch set because the selected one is conditioned to be engaged after the selected direction clutch and thus operates to pick up the load. The transmission will now be more fully explained.

The transmission as shown comprises: a front housing 10 for a coupling device, not shown, including an engine connected shaft 12 by which the vehicle engine, not shown, applies power to the transmission, and a coupling shaft 14 carrying a universal joint U; a transmission case 16 comprising an input shaft 18 connected to the universal joint U carried by the coupling shaft a longitudinally passaged output shaft 20 defining with the input shaft a vertical reference plane, a countershaft 22, the center line of which is on the side of the vertical reference plane away from the viewer and is at a level at the actual center line position indicated, and a reverse idler shaft 24, the center line of which in actuality is on the side of the vertical reference plane away from the viewer and is at a level at the actual position indicated; and a vehicle steering and final drive including a bevel pinion 26 connected to the output shaft 20 for delivering the transmission power in order to drive the vehicle, which for example can be a crawler tractor, not shown.

HOUSING FOR COUPLING — FIG. 3

Within the front housing 10, the engine connected shaft 12 carries an engine flywheel 28 provided at its periphery with a ring of starter gear teeth 30. By suitable connections thereto, the coupling device, not shown, interconnects the flywheel 28 and the coupling shaft 14 and, in addition, carries a partially shown pump drive pinion 32. The drive pinion 32 is directly connected to a lower pump gear 34, and is indirectly connected through a reverse idler 36 to an upper pump gear 38. The gears 34 and 38 individually drive components such as the upper component 40 which is a transmission pump.

TRANSMISSION CASE — FIGS. 1, 2, AND 5

In the transmission case 16, a span of bearings 42 journals the input shaft 18 for rotation on its axis which is contained in the earlier referred to vertical reference plane, and a span of bearings 44 journals the output shaft 20 for rotation on its axis likewise contained in the vertical reference plane. A forward gear 46 and a reverse gear 48, relatively rotatably mounted on the input shaft 18, are controlled by the respective forward (F) clutch 4 and reverse (R) clutch 5 for rotation conjointly with or independently of the input shaft 18. A first gear 50, a second gear 52, and a third gear 54, relatively rotatably mounted on the output shaft 20 are controlled by the respective low speed clutch 1, medium speed clutch 2, and high speed clutch 3 for rotation of no more than one clutch conjointly with the output shaft and the rotation of the others independently of the output shaft.

A span of bearings 56 journals an idler gear 58 for rotation on the reverse idler shaft 24 which is fixed to the transmission case 16.

In the case 16, a span of bearings 60 journals the countershaft 22 which carries and jointly rotates with a low gear 62, an intermediate gear 64, and a high gear 66. It is the latter gear 66 by which the input shaft establishes all power paths to the output shaft 20 in the forward range of speeds.

Specifically, power for high speed forward is transmitted in a direct path from the input shaft forward gear 46, through the intermeshing high gear 66 and third gear 54, through the load clutch 3 as it engages, thence through the output shaft 20 to the power delivering bevel pinion 26. Somewhat similarly, the power path for low speed is from the forward gear 46, through the gear 66 and low gear 62, through the first gear 50 and load clutch 1 as it engages, thence through the output shaft 20 to the pinion 26. For intermediate forward speed, power is transmitted from the forward gear 46, through the gears 66 and 52, through the load clutch 2 as it engages, thence through the output shaft 20 to pinion 26.

It is the power path through the idler gear 58 and intermediate gear 64 by which the reverse clutch 5 transmits the reverse range from the input shaft 18 to the output shaft. Specifically for intermediate speed, the power path is from the gears 48, 58, and 64, through the second gear 52 and load clutch 2 as it engages, thence through the output shaft 20 and pinion 26. High speed reverse power flow is from the same gears 48, 58, and 64, through the gears 66 and 54, through the load clutch 3 as it engages, thence into the output shaft and pinion 26. Finally, for low speed reverse, power flows from the gears 48, 58, and 64, through the gears 62 and 50 and load clutch 1 as it engages, thence into the output shaft 20 and pinion 26.

FLOATING MANIFOLDS — FIG. 2

The output shaft 20 at its intermediate section supports and is relatively rotatable within a floating manifold 68. The manifold is a sleeve which interconnects a first fluid line 70 and a shaft passage 72 included therein, interconnects a second fluid line 74 and a shaft passage 76 included in the line, and interconnects a third fluid line 78 and a shaft passage 80 included therein. The shaft passages 72 and 80 to provide separate connections at opposite sides of a reaction member 82 between the clutches 1 and 3 for applying hydraulic pressure selectively to operate the two clutches. The shaft passage 76 in the second fluid line provides a connection to a piston 84 for the intermediate clutch 2 for applying hydraulic pressure to operate the latter.

The manifold 68 also interconnects a lube line 86 leading to a groove 87 and a longitudinal shaft passage 88 providing separate first, second, and third connections 90, 92 and 94 to clutches 1, 2, and 3 in order to indroduce the flow of cooling fluid thereto.

By means of needle bearings 96 at its ends, the cylindrical manifold 68 centers itself on the midsection of the output shaft 20 and can constantly adjust in position so that by proper shifting with the shaft it readily accommodates to shaft deflections. Seals which are shown between the respective rows of needle elements in the needle bearings 96 and between the shaft and manifold 68 keep hydraulic fluid in the lines separate and are constantly lubricated through restricted passages 98 in the shaft leading from the longitudinal shaft passage 88 for lubricant.

The manifold 68 is held against rotation with the shaft by means of a radial rod 100 carried by the manifold and keyed at its outer end in a longitudinally extending fork 102 which is anchored to the case 16. The sleeve manifold is thus afforded freedom to move in 2°, i.e., with radial sleeve adjustment slightly toward and away from the plane of the fork 102 as the rod reciprocates therein, and with slight longitudinal adjustment of the sleeve parallel to the output shaft and to the fork 102. The connection never allows the rod to revolve, and it shifts in the fork by sliding.

Similarly, a floating manifold 104 is mounted the same way for the same purpose on an intermediate section of the input shaft 18. The manifold 104 interconnects a forward fluid line 106 and a shaft passage 108 included therein, interconnects a reverse line 110 and a shaft passage 112 included in the reverse line, and interconnects a lube line 114 and a shaft passage 116 included therein for hydraulic cooling flow to the forward and reverse clutches 4 and 5. The shaft passages 108 and 112 provide separate connections through a reaction member 118 between the direction clutches 4 and 5 for applying hydraulic pressure selectively to operate the latter.

The manifolds are comparatively cheap, light, and small sleeves, free from rapid wear and friction drag, and readily staying centered on the supporting shaft for good sealing while the shaft deflects and undeflects. The purpose of the sleeve manifolds is not as any structural member to fix the shaft centerline, but as a dynamic unresisting member staying accurately self centered to accommodate to all shaft deflections.

MULTIRATE FLOW — FIG. 6 TYPE

Annular forward and reverse pistons 120 and 122 are moved by hydraulic pressure in opposite directions from one another out of complementary piston chambers on opposite sides of the just mentioned reaction member 118 between clutches 4 and 5 on the input shaft 18. Axial movement of the pistons compresses the clutch plates against backing members such as the one typified by the forward clutch backing member 124. When engaged by the piston, the forward clutch 4 establishes forward drive from the input shaft 18, through the keyed on reaction member 118 and outer discs of the clutch 4, through the friction engaged inner discs of the clutch 4, thence from inner splines to the forward gear 46 to which the splines are made fast.

The shaft passage 116 terminates in a forward lube port 126 which radially communicates at its inner end with the passage 116 and at its outer end with a circumferential groove in the input shaft 18. A combined spring seat and shuttling blocking sleeve 128 on the input shaft 18 is in the path of the forward piston 120 so as to be engaged and moved thereby between a position as shown in solid lines against a shaft snap ring 130 and an engaged position as corresponds to the engaged position of the clutch 4 and as shown in broken lines 132 closely adjacent a spring seat 134. The piston 120 and the shuttling sleeve 128 are controlled by hydraulic pressure and by a clutch disengaging return spring 136 which is preloaded between the sleeve 128 and the spring seat 134. In practice, the spring 126 is actually one of a series of other clutch return springs which act therewith to return piston and sleeve to disengaged position.

Cooling flow is normally at a lo rate in a path from the shaft passage 116, through the radial passage and forward lube port 126, through the shaft port groove, thence through a single restricted sleeve hole 138 to the clutch 4, which thus receives minor surface lubrication and cooling. But in the engaged position of the sleeve as shown by the broken lines 132, hi cooling flow occurs because of the path afforded by three sleeve holes 140 which communicate with the lube port and port groove by means of a sleeve groove therebetween.

A reverse lube port 144 and a reverse shuttling block sleeve 146 cooperate in the same way with the reverse piston 122, the operation similarly being controlled by hydraulic pressure and by return springs. The return springs also load the sleeve so as to bear against and follow the piston at all times at which the latter is displaced.

MULTIRATE FLOW — FIG. 7 TYPE

In each of the clutches 1, 2, and 3 on the output shaft 20, I employ a combined piston flange portion and shuttling blocking sleeve as typified by the sleeve 148 included with the clutch 1 on the output shaft. The large diameter of the clutch 1 necessitates a large, low clutch piston 150 therefor, and the sleeve 148 presents clutch flange piston area augmenting the piston area of, and operating in tandem with, the piston 150. An annular rib 152 carried by the piston is in the path of the sleeve 148 so that hydraulic pressure transmitted through the reaction member 82 moves the sleeve and piston from their respective broken line positions 154 and 156 conjointly to engaged position. The sleeve hydraulically adds materially to the clutching force.

The actuated or engaged position is shown in solid lines, where it is seen that the sleeve is in the path of the annular rib 152 so that one spring 158 in a series of other clutch return springs acts therewith against the piston 150 to urge the sleeve and piston back into their broken line positions 156, 158. A single restrictive sleeve hole 160 is effective when the sleeve is in the broken line position to communicate lo cooling flow to the clutch 1 when disengaged, in a path leading from the adjacent lube line shaft passage 88, radially through a low port 164, through a port groove in the shaft 20, thence through the hole 160 restrictively to the clutch 1. But when the sleeve is in the solid line position corresponding to clutch engaged position, four sleeve holes 162 are effective to provide hi cooling flow.

While the rate of flow is greatly multiplied at the critical time with the change from the hole 160 to the holes 162, the course of flow is the same. Lube oil flows in the cooling path on the shaft passage to the clutch 1 in the way described.

In both type embodiments foregoing, the shuttle sleeves will be seen to be operable automatically attendant with movement of the friction engaging means concerned. In the FIG. 6 type sleeve 128, the movement has to be attendant with physical movement of the friction engaging means because the sleeve is mechanically in the path of the piston 120. And the fact in point in the FIG. 7 type sleeve 148 is the sleeve cannot move unless and until the piston 150 moves thereahead.

COUPLING — FIG. 5

The coupling illustrated within the housing 10 is a commercially available torque converter 166, having toric blading forming respectively a pump P, a turbine T, and a stator S. The convertor affords an infinitely variable ratio in the transmission up to low speed forward and up to low speed in reverse. Thereafter, a change speed power shift in the transmission will cause the vehicle to proceed at intermediate speed forward or reverse, and finally at high speed in forward or reverse. Also the converter allows the transmission to give the vehicle a smooth start up directly in the intermediate setting and directly in the high setting.

PUMP CONNECTIONS — FIG. 8

The previously referred to upper component is a pump component 40 driven from the torque converter 166 by the so-called upper pump gear 38. A regulator valve stack hydraulically connected to the pump outlet 174 comprises high, intermediate, and low regulator valves 168, 170, and 172 by which the pump 40 supplies 250 psi. engaging pressure oil to a line pressure line 176, 80 psi. oil to a converter pressure line 178, and 30 psi. oil through a lube manifold 180. Flow in the lube manifold line 180 is augmented by the flow leaving a convertor cooler 182 which maintains back pressure in usual way on the converter 166.

Oil in the line pressure line 176 leading from the pump is directed by a sequencing valve 184 first to a manual direction valve 186 for engaging the direction clutch selected and second to a manual speed valve 188 for engaging a selected load clutch. Details of the sequencing valve 184 by which it is afforded automatic operation are separately disclosed and claimed in a copending Horsch patent application owned by the same assignee.

A sequencing valve drain 190 and a lube drain 192 from the low regulator valve 172 in the regulator stack are connected to a sump 194 which supplies the pump 40. Reference pressure taps 196 from the line pressure line 176 are connected to the sequencing valve 184. Other parts identified by reference numerals in FIG. 8 will be recognized from the preceding description.

From the foregoing, it will be appreciated that fluid pressure control exerted by the sequencing valve 184 for dual operation at the right time of the direction and load clutches respectively, is not interfered with by the fluid flow control in its dual operation. That is to say, fluid flow control maintained by the individual shuttling blocking sleeves for dual operation, at the right time, of directed lo cooling flow and unblocked hi cooling flow to each clutch does not interfere with the pressure level at sequencing valve 184 in its dual operation. The respective circuits and the respective three stages of pressure thereof are kept separate by the high, intermediate, and low regulator valves 168, 170, and 172.

Effective at the optimum time therefor, the restricted lube oil has a low flow rate, established by the blocking sleeves when the clutch discs are disengaged, to slightly wet and prevent such discs from dragging against one another in dry state. Effective at the optimum time therefor, the lube oil is unblocked by the sleeves for hi cooling flow to the clutch discs while at and to and from their engaged position. By being so flooded with cooling oil, the clutch discs as they unavoidably slip under load in engaging and disengaging are cooled with adequate liquid. So on the one hand they are not overheated and they are not overheated when engaged after stopping all slippage, while on the other hand at the same time the plurality of disengaged clutches consumes a minimal amount and requires a minimal amount of the lube oil. Precisely as desired, the non-selected clutches avoid any appreciable waste of fluid flow, needed by the selected clutches or clutch, because of the sleeves, and such fluid flow is prevented from wasting or dropping down the line fluid pressure because the fluid flow and fluid pressure control circuits are separate.

That is to say, when the blocking sleeve 128 or 146 for one selected direction clutch 4 or 5 is directing coolant to the selected clutch during its engagement, the blocking sleeve for the other direction clutch is blocking same to conserve the consumption of lube oil flow, all the while that the shuttling blocking sleeve 148 on the output shaft 20 and an intermediate clutch blocking sleeve 148$i$ and a high clutch blocking sleeve 148$h$ are likewise conserving lube oil in the shaft 20. Subsequently when the associated one of the sleeves 148, 148$i$, and 148$h$ moves into the unblocking position to flood the selected load clutch 1, 2 or 3, the other two of the three sleeves 148, 148$i$, and 148$h$ on the output shaft 20 conserve flow in their blocking position; likewise, one of the two sleeves 128 or 146 on the input shaft 18 is conserving lube oil flow because the associated sleeve for the selected direction clutch is the only one occupying unblocking position.

While the engaged clutch in the direction clutch set on the shaft 18 and the engaged clutch in the load set on shaft 20 are in engaged position or are being disengaged, lube flow is still being conserved by the associated sleeves respectively for the other two clutches in the load set and for the other clutch in the direction set.

Finally, flow is conserved by all five sleeves 128, 146, 148, 148$i$, and 148$h$ when all clutches are in the disengaged position due to the transmission disclosed being in neutral. The same principles equally apply to other transmissions in which all of the friction engaging devices or less than all are oil cooled fluid pressure operated brakes, such as commonly employed in transmissions including power shift planetary transmissions.

Variations within the spirit and scope of the invention described are equally comprehended by the foregoing description.

What is claimed is:

1. Deflectible, supporting, clutch shaft structure of an hydraulic type for rotatably supporting a set of friction engaging means in a transmission, said shaft being plural-passaged, and having a longitudinal axis and having:
    longitudinal means in the shaft forming a plurality of fluid pressure control passages in the shaft generally adjacent its axis;
    a supported, stationary sleeve manifold about the supporting shaft, said manifold having plural means of communication, registering therewith in said shaft, and being in communication therethrough with the passages in said shaft and floatingly related thereto so as to journal the latter in rows of bearing elements for relative rotation therein;
    means supporting the shaft and sleeve manifold in the relationship described, including antifriction bearing elements at the ends of the shaft for rotation of the latter on its axis; and
    a shifting connection between the supporting means and sleeve manifold, accommodating floating of the sleeve manifold with its freedom of movement limited thereby to making radial and longitudinal sleeve adjustment to shaft deflections as said rows of bearing elements constrain the manifold to centering itself;
    said plural passaged shaft further having seals which are between said plural means of communication and between the shaft and sleeve manifold to keep the fluid in said passages separate;
    said plural passaged shaft additionally having separate fluid flow means for providing said seals and said rows of bearing elements with lubricant.

2. The invention of claim 1, said fluid flow means comprising a lubricant fluid flow passage in the shaft generally adjacent its axis, and means of communication in said shaft registering with lube line means in said manifold so that the latter communicates therethrough with said lubricant fluid flow passage in said shaft.

* * * * *